US009699320B2

(12) United States Patent
Bouvet

(10) Patent No.: US 9,699,320 B2
(45) Date of Patent: Jul. 4, 2017

(54) PROCESSING OF A REQUEST TO INSTIGATE COMMUNICATION BY A ROUTING DEVICE ASSOCIATED WITH A PLURALITY OF TERMINALS

(75) Inventor: Bertrand Bouvet, Perros-Guirec (FR)

(73) Assignee: ORANGE, Paris (FR)

( * ) Notice: Subject to any disclaimer, the term of this patent is extended or adjusted under 35 U.S.C. 154(b) by 527 days.

(21) Appl. No.: 13/131,694

(22) PCT Filed: Nov. 25, 2009

(86) PCT No.: PCT/FR2009/052292
§ 371 (c)(1),
(2), (4) Date: Jun. 15, 2011

(87) PCT Pub. No.: WO2010/061132
PCT Pub. Date: Jun. 3, 2010

(65) Prior Publication Data
US 2011/0267989 A1 Nov. 3, 2011

(30) Foreign Application Priority Data
Nov. 28, 2008 (FR) ..................... 08 58135

(51) Int. Cl.
H04L 12/12 (2006.01)
H04M 7/00 (2006.01)
(Continued)

(52) U.S. Cl.
CPC ...... H04M 7/0072 (2013.01); H04L 65/1069 (2013.01); H04M 3/42229 (2013.01); H04L 69/24 (2013.01)

(58) Field of Classification Search
USPC ....... 370/252, 254, 255, 261, 328, 329, 332, 370/395.42, 395.2, 400, 401
See application file for complete search history.

(56) References Cited

U.S. PATENT DOCUMENTS 6,363,258 B1 * 3/2002 Schmidt et al. ............... 455/514
2002/0045466 A1 * 4/2002 Teranishi .............. H04M 1/663
455/567

(Continued)

FOREIGN PATENT DOCUMENTS

EP 1968334 A2 9/2008

OTHER PUBLICATIONS

English translation of the Written Opinion dated Jun. 7, 2011 from corresponding International Application No. PCT/FR2009/052292 filed on Nov. 25, 2009.
(Continued)

Primary Examiner — Yemane Mesfin
Assistant Examiner — Mon Cheri Davenport
(74) Attorney, Agent, or Firm — David D. Brush; Westman, Champlin & Koehler, P.A.

(57) ABSTRACT

A method and apparatus are provided for processing a request to instigate communication, received by a routing device associated with a plurality of terminals. The request relates to a communication to be established between a sender device of the request and at least one of the terminals. The method includes a step of comparing communication capabilities of said sender device with respective communication capabilities of one or more terminals, called addressee terminals, which are able to establish said communication, so as to identify at least one terminal having capabilities making it possible to establish with the sender device a communication of maximum quality. A call notification is transmitted to at least one of the addressee terminals, which is suitable for triggering on the addressee terminal a call presentation prompting a user to use, by priority, one of the terminals identified during the comparison step to establish the communication.

9 Claims, 2 Drawing Sheets

(51) Int. Cl.
*H04M 3/42* (2006.01)
*H04L 29/06* (2006.01)

(56) References Cited

U.S. PATENT DOCUMENTS

2003/0139181 A1* 7/2003 Roy et al. ............... 455/427
2005/0210148 A1* 9/2005 Kato et al. ............... 709/244
2008/0219223 A1* 9/2008 Bienas et al. ............ 370/338

OTHER PUBLICATIONS

International Search Report dated Feb. 8, 2010 for corresponding International Application No. PCT/FR2009/052292, filed Nov. 25, 2009.
Written Opinion dated Feb. 8, 2010 for corresponding International Application No. PCT/FR2009/052292, filed Nov. 25, 2009.

* cited by examiner

PROCESSING OF A REQUEST TO INSTIGATE COMMUNICATION BY A ROUTING DEVICE ASSOCIATED WITH A PLURALITY OF TERMINALS

CROSS-REFERENCE TO RELATED APPLICATIONS

This Application is a Section 371 National Stage Application of International Application No. PCT/FR2009/052292, filed Nov. 25, 2009 and published as WO 2010/061132 on Jun. 3, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The relates to the field of telecommunications and more particularly to a method and device for processing a request to instigate communication by a routing device associated with a plurality of terminals.

BACKGROUND OF THE DISCLOSURE

New digital telephone terminals are now available with superior voice quality to that available as standard on conventional telephones. This voice quality is obtained by implementing a module for coding speech in the form of a broadband stream. These terminals therefore support several codecs so as to be able to establish a communication with any terminal whatsoever from the pool of existing terminals, in particular with the terminals having only a standard quality codec.

This type of coding, termed "broadband coding", can be performed in accordance with the G.722 coding norm for a VoIP (Voice Over IP) terminal, while the coding termed "standard coding" may be in accordance with the G.711 coding norm. In the case of a communication established across a GSM mobile network, broadband communications are possible by means of an AMR WB codec. Conversion gateways are designed to transform a stream coded according to the G.722 standard into a stream coded according to the AMR WB standard and vice versa, so as to allow the establishment of broadband communications between a VoIP client terminal equipped with a G.722 codec and a mobile client terminal equipped with an AMR WB codec.

Indeed, to benefit from a telephonic communication of superior quality, it is necessary for both the calling terminal and the called terminal to have a broadband coding module, otherwise a communication between these terminals may be established only at standard quality.

Consequently, when establishing a communication from a first terminal equipped with a broadband codec, only a second terminal equipped with a broadband codec will be able to establish a communication at broadband quality with this first terminal.

SUMMARY

The requirement is thus apparent, when using a device for routing communications for a plurality of terminals, to take into account, during the routing of a request to instigate communication, the respective capabilities of the terminals that are able to establish the communication if it is desired to obtain maximum communication quality.

An embodiment of the invention relates, according to a first aspect, to a method for processing a request to instigate communication, received by a routing device associated with a plurality of terminals, relating to a communication to be established between a sender device issuing said request and at least one of said terminals, the method comprising, a step of comparing communication capabilities of said sender device with respective communication capabilities of one or more terminals that are able to establish said communication, so as to identify at least one terminal having capabilities making it possible to establish with the sender device a communication of maximum quality, a step of transmitting to at least one of said terminals a call notification suitable for triggering on the addressee terminal or terminals receiving this or these notifications a call presentation prompting a user to use by priority one of the terminals identified during the comparison step to establish the communication.

Consequently, in the case where several terminals are able to establish the communication, for example in the case where they are attached to the same public identity, it is possible to retain a control on the quality of the communication actually established, by favoring, or indeed forcing, the use of a terminal guaranteeing maximum communication quality.

To favor this communication of maximum quality, the call presentation proceeds for example in such a way that a user is constrained, at least temporarily, to use one of the identified terminals to establish said communication or that this user is informed that he is recommended to use one of the identified terminals to establish said communication.

In order to constrain the user to use one of the identified terminals to establish said communication, the call notification is transmitted solely to the identified terminals, at least during a first phase of the transmission step. Indeed, in a second phase, other terminals, if any, that are able to establish said communication can receive this notification if the call is not established during the first phase.

In order to inform the user that he is recommended to use one of the identified terminals to establish said communication, the call notification transmitted to the identified terminals is such that the call presentation which is triggered on receipt thereof by the terminal considered is different from that triggered on the other terminals, if any, that are able to establish said communication.

An embodiment of the invention is applicable to any call presentation procedure: by triggering ring tones and/or vibrations (vibrator mode in the case of a mobile telephone), sending of audio signals and/or visual indicators of a call, display of textual information, etc.

An embodiment of the invention relates according to a second aspect to a device for processing a request to instigate communication, received by a routing device associated with a plurality of terminals, relating to a communication to be established between a sender device issuing said request and at least one of said terminals, the processing device comprising, means for comparing communication capabilities of said sender device with respective communication capabilities of one or more terminals that are able to establish said communication, so as to identify at least one terminal having capabilities making it possible to establish with the sender device a communication of maximum quality, means for transmitting to at least one of said terminals a call notification suitable for triggering on the addressee terminal or terminals receiving this or these notifications a call presentation prompting a user to use by priority one of the terminals identified during the comparison step to establish the communication.

The stated advantages for the method according to an embodiment of the invention are transposable directly to the device according to an embodiment of the invention.

Correlatively, an embodiment of the invention relates to a method for processing a request to instigate communication, received by a terminal comprising a plurality of communication modules, relating to a communication to be established with a sender device issuing said request by means of at least one of said modules, the method comprising, a step of comparing communication capabilities of said sender device with respective communication capabilities of the modules that are able to establish said communication, so as to identify at least one module having capabilities making it possible to establish with the sender device a communication of maximum quality, a step of presenting said request to a user, prompting a user to use by priority one of the modules identified during the comparison step to establish the communication.

As a supplement, an embodiment of the invention relates to a terminal comprising a plurality of communication modules, receiving a request to instigate communication relating to a communication to be established with a sender device issuing said request by means of at least one of said modules, the method comprising, means for comparing communication capabilities of said sender device with respective communication capabilities of the modules that are able to establish said communication, so as to identify at least one module having capabilities making it possible to establish with the sender device a communication of maximum quality, means for presenting said request to a user, designed to prompt a user to use by priority one of the modules identified during the comparison step to establish the communication.

The stated advantages for the implementation by a routing device, receiving a call intended to be established by means of a terminal associated with this device, are transposable directly to the implementation by a terminal comprising a plurality of communication modules and receiving a call to be established by means of one of the communication modules, the principles of an embodiment of the invention remain identical when there are several terminals managed by a routing device or a single terminal managing several internal communication modules.

According to a preferred implementation, the various steps of the method according to an embodiment of the invention are implemented by software or a computer program, this software comprising software instructions intended to be executed by a data processor of a device for processing a request to instigate communication and being designed to control the execution of the various steps of this method.

Consequently, an embodiment of the invention is also aimed at a program that can be executed by a computer or by a data processor, this program comprising instructions for controlling the execution of the steps of a method such as mentioned hereinabove.

This program can use any programming language, and be in the form of source code, object code, or of code intermediate between source code and object code, such as in a partially compiled form, or in any other desirable form.

An embodiment of the invention is also aimed at an information medium readable by a computer or data processor, and comprising instructions of a program such as mentioned hereinabove.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to an embodiment of the invention may be in particular downloaded from a network of Internet type.

Alternatively, the information medium may be an integrated circuit into which the program is incorporated, the circuit being adapted for executing or to be used in the execution of the method in question.

According to another implementation, an embodiment of the invention is implemented by means of software components and/or hardware components. With this in mind, the term module can correspond in this document equally well to a software component and to a hardware component or else to a programmable hardware component, with or without integrated processor. A software component corresponds to one or more computer programs, one or more subroutines of a program, or in a more general manner to any element of a program or of a piece of software able to implement a function or a set of functions, according to what is described for the module concerned. In the same manner, a hardware component corresponds to any element of a hardware set able to implement a function or a set of functions, according to what is described for the module concerned.

BRIEF DESCRIPTION OF THE DRAWINGS

Other aims, characteristics and advantages will appear through the description which follows, given solely by way of nonlimiting example and with reference to the appended drawings in which.

DETAILED DESCRIPTION OF ILLUSTRATIVE EMBODIMENTS

Figure 1:
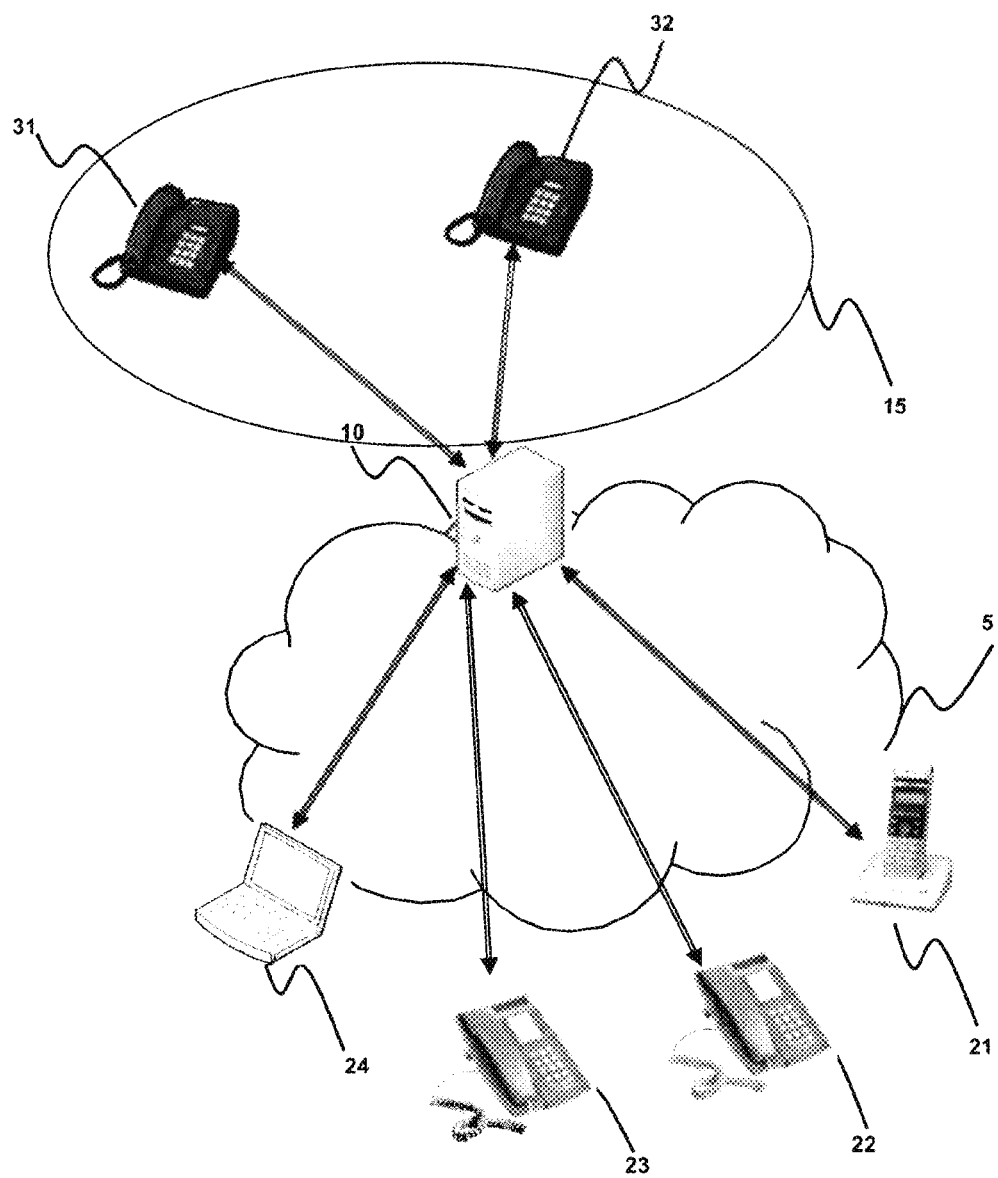
FIG. 1 represents in a schematic manner a communication system integrating a device according to an embodiment of the invention.

The system represented in FIG. 1 comprises:
a local area network 5;
a wide area network 15, for example the Internet network;
an gateway 10 for interconnection between the local area network 5 and the wide area network 15;
a plurality of terminals 21 to 24 forming part of the local area network 5 and interconnected with the gateway 10 across the local area network 5;

two remote terminals 31 and 32, accessing the wide area network 15.

The interconnection gateway 10 allows the terminals 21 to 24 to access the wide area network 15, in particular so as to establish a communication with one of the remote terminals 31 or 32. With this aim, the gateway comprises a module for, at the request of a terminal of the local area network, transmitting a request to establish a communication with a remote terminal, for example one of the terminals 31 and 32.

Conversely, in the case of request to establish a communication sent by one of the remote terminals 31 or 32, the request to instigate communication is transmitted to the gateway 10 which plays the role of routing device for the processing of the incoming communications entering the local area network and destined for any one of the terminals 21 to 24.

The terminals 21 to 24 can of various types, for example:
an analog telephone terminal 21;
a standard DECT digital telephone terminal 22;
a broadband DECT digital telephone terminal 23;
a personal computer 24;

Each of these terminals is connected to the gateway 10 via an appropriate interface of this gateway: for example via an FXS (Foreign eXchange Subscriber) interface in the case of the terminals 21 or 22, or via a USB interface in the case of the terminal 23, or else via an Ethernet port in the case of the terminal 24.

The gateway 10 dialogs with the terminals 21 to 24 and manages the communications to be established with these terminals. It intercepts in particular the control and signaling messages in accordance for example with the SIP protocol which are used for establishing such communications. These communications may equally well be telephonic, videophonic, instantaneous messaging communications, or any type of transmission of data.

The remote terminals 31 and 32 are also equipped with a communication module for establishing communications and for dispatching and processing the necessary control and signaling messages.

The subsequent description is given in the case of application of an embodiment of the invention to a request to instigate telephonic communication.

The gateway 10 comprises a call presentation module for the processing and the transmission of a call notification, forming a request to instigate communication, originating from a remote terminal and the implementation of a presentation mode used for the presentation of this call, so as inform a user of these terminals of the request to instigate communication.

In the prior art, it is known that the gateway transmits a call notification to all the terminals that are able to establish the communication: all these terminals receiving the call notification ring on receipt of this notification. The quality of the communication established depends in this case on the calling telephone and on the telephone by means of which the communication is established, that is to say the first telephone by means of which a user goes off-hook.

By assuming that the gateway 10 transmits the call notification to the terminals 21 to 23, able to establish the communication, two typical cases can arise.

In the first case, subsequent to an outgoing call initiated from the terminal 31 supporting the G.722 improved quality and the G.711 standard quality, a user goes off-hook first by means of the terminal 22, not equipped with a broadband codec: in this case the gateway returns a response message, of the type "SIP 200 OK", with the SDP parameter set to the G.711 coding mode to indicate that the call is accepted and that the quality will be the standard quality. On receipt of this response message, the terminal 31 originating the notification establishes the communication by using a standard coding mode (G.711). Consequently, the caller and the called party have a standard voice quality.

In the second case, subsequent to an outgoing call initiated from the terminal 31 supporting the G.722 improved quality and the G.711 standard quality, a user goes off-hook first by means of the terminal 23, equipped with a broadband codec: in this case the gateway returns a response message, of the type "SIP 200 OK", with the SDP parameter set to the G722 coding mode to indicate that the communication is accepted and that the quality will be broadband improved voice quality. On receipt of this response message, the terminal 31 originating the call notification establishes the communication by using a broadband coding mode (G.722). Consequently, the caller and the called party have an improved voice quality due to the implementation, at one and the same time by the calling terminal and by the called terminal, of a broadband codec.

Thus, in the prior art, the quality of the established communication depends on chance in that it depends on the terminal by means of which the user decides to go off-hook.

An embodiment of the invention responds to this problem through the implementation of a mode of presentation aimed at prompting a user to establish by priority the communication by means of one of the terminals identified as having capabilities making it possible to establish a communication of maximum quality.

Figure 2:
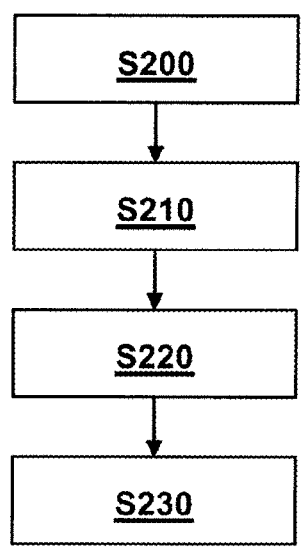
FIG. 2 represents a flowchart of an embodiment of the method according to an embodiment of the invention.

An embodiment of the method according to the invention is described in greater detail hereinbelow with reference to FIG. 2.

In step 200, a call notification, forming a request to instigate communication, relating to a communication to be established with one of the terminals 21 to 24, is received by the gateway 10. This notification is in the form of a call presentation message, in accordance for example with the SIP protocol and comprising:
a calling subscriber identification, in the form usually of a telephone line number, this identification being in this instance associated with the calling terminal 31 originating the notification;
an identification of an addressee subscriber, in the form usually of a telephone line number, this identification being in this instance associated with the gateway 10 and with the set of terminals 21 to 24 managed by this gateway;
a protocol description field (SDP, Session Description Protocol) which comprises a list of the codecs supported by the calling terminal 31, the list of the codecs being ordered according to an order indicative of a preference in the selection of the codec: a codec C1 being cited in the list before a codec C2 if the codec C1 must be selected by priority, since it makes it possible in particular to establish a call of better quality than the codec C2; for example, when the calling terminal has a G.711 codec and a G.722 codec, the broadband G.722 codec is proposed first, the standard quality G.711 codec being listed second.

In step 210, the gateway 10 obtains, from the message received in step 200, at least one parameter representative of the communication capabilities of the calling terminal: with this aim it extracts the codec appearing first in the list of supported codecs. Other parameters can also be extracted from the notification message when they are present.

In step 220, the gateway 10 compares the parameter or parameters obtained in step 210 with the respective communication capabilities of the terminal or terminals that are able to establish the communication, so as to identify, from among the terminals compatible with the terminal calling, at least one terminal having capabilities making it possible to maximize the quality of the communication established when this communication is established with the terminal considered.

When several terminals have equal or equivalent capabilities making it possible to maximize the quality of the communication, the gateway 10 can either retain all these terminals, or choose one arbitrarily or according to an order preferably defined by a user. In all cases, the gateway 10 identifies at least one terminal, this terminal being intended to be treated differently during the implementation of the call presentation so as to constrain or prompt a user to establish the communication (that is to say to go off-hook) by means of one of the identified terminals.

The mode of transmission by the gateway of the call notification or notifications and/or the processing performed by the terminal or terminals receiving this or these notifications are such that, the call presentation thus triggered allows a user to distinguish the terminal or terminals identified in step 220 with respect to the terminals not retained in step 220.

In particular, the call notification or notifications sent are suitable for triggering a call presentation allowing a user to distinguish the terminals identified during step 220 with respect to any other terminals that are able to establish the communication.

In the example described, the terminals equipped with a codec identical to that listed first in the notification message or compatible with such a codec are identified as meeting this criterion. A codec compatible with the G.722 codec is for example an AMR WB codec.

In the case where no terminal is identified, the codec listed second in the notification message is considered so as to identify at least one terminal compatible with the calling terminal when it uses this second codec.

In the example described, the gateway identifies the terminal 23 as being the only terminal having a broadband codec compatible with the broadband codec declared for the calling terminal 31.

The information about the capabilities of the terminals managed by the gateway 10 is obtained by the gateway either by dispatching, to a terminal by the gateway, of an interrogation query to which the terminal responds by indicating its communication capabilities, or by dispatching to the gateway by the terminal a message for declaring its capabilities. Such messages are for example messages of SIP REGISTER type. Any other appropriate message format or protocol is also usable. The message comprises an identification of the codecs and/or coding formats supported by the terminal considered.

Note that the gateway could also obtain the list of codecs supported in a static manner through the communication port used to connect a terminal, for example G.711 for an FXS port, G.722 and G711 for a USB port.

In step 230, the gateway 10 transmits the notification to at least one of the terminals that are able to establish the communication according to a call presentation mode aimed at prompting a user to establish by priority the communication by means of one of the terminals identified during the comparison step 220. Various alternative embodiments are described hereinbelow for the implementation of such a call presentation mode.

As regards the mode of transmission to the terminals of the call notification or the call presentation mode, several alternatives are possible in respect of the selection of the terminals to which the notification is transmitted or in respect of the order in which the notifications are dispatched to the various terminals or in respect of the call presentation mode (choice of the triggered ring tone, in the example described here) triggered by these notifications. As described in greater detail hereinbelow, the call presentation mode triggered by a call notification is dependent on the content of this call notification.

According to a first alternative embodiment, the call notification is firstly transmitted (first phase) to the terminals identified during the comparison step 220, and then (second phase), after a determined duration or a determined number of ring tones, to any other terminals that are able to establish the communication. This second phase is executed only if the call has not already been established during the first phase.

The user is here prompted to respond by means of one of the terminals ringing first, that is to say those receiving the call notification first. The user is thus constrained temporarily, during the time period during which only the identified terminals ring, to use these terminals. Indeed, in a known manner, as long as no call notification is transmitted to a terminal, the communication may not be established with this terminal.

In this first alternative, two embodiments are possible as regards the ring tones triggered by the terminals on receipt of the call notification.

In a first embodiment, the mode of presentation is such that a different call notification ring tone is used for the terminals identified during the comparison step 220, with respect to any other terminals that are able to establish the communication. This makes it possible to inform a user that he is recommended to go off-hook by means of a terminal identified using a different ring tone.

The choice of the ring tone triggered by a terminal is made by the terminal itself as a function of the information contained in the notification received from the gateway. The simple consideration of the list of codecs present in the notification indeed makes it possible to determine whether or not the terminal is compatible with the first codec of the list and therefore to know which ring tone is to be triggered: ring tone associated with a standard quality or ring tone associated with a broadband quality.

The choice of the ring tone could also be carried out by the gateway 10 for certain types of terminals whose ring tone may be controlled remotely. In this case, the call notification comprises an identification of the ring tone to be used and the terminal triggers the identified ring tone.

In a second embodiment, the mode of presentation is such that all the terminals that are able to establish the communication ring with their own specific ring tone (their default ring tone for example).

According to a second alternative embodiment, the call notification is transmitted solely to the terminals identified during the comparison step 220 and not to any other terminals that are able to establish the communication. The user is here forced to respond by means of one of the ringing terminals, that is to say only those receiving the call notification.

In this second alternative, the mode of presentation is such that all the terminals receiving the call notification can ring with their own specific ring tone (their default ring tone for example).

According to a third alternative embodiment, the call notification is transmitted to all the terminals simultaneously, but with triggering of a different call notification ring tone for the terminals identified during the comparison step 220, with respect to any other terminals that are able to establish the communication. This allows a user to be informed that he is recommended to go off-hook by means of a terminal using a different ring tone.

In this third alternative, two different ring tones will therefore have to be available for each terminal: either two ring tones each with a different audio content, or one and the same audio content with two different sound levels.

As in the second alternative, the choice of the ring tone triggered by a terminal is made by the terminal itself as a function of the information contained in the notification received from the gateway or by the gateway 10 for the terminals whose ring tone may be controlled remotely. In particular, the sound content of the ring tone to be used may be defined by a file stored by the gateway or the terminal.

Furthermore, in combination with any one of the alternatives described hereinabove, the user is informed, during the presentation of the call, about a level of communication quality liable to be obtained.

According to a first alternative, this information is performed by display, by the terminal receiving the call notification, of an icon representative of this level of quality or of a message informing the user about this level of quality, for example "Call 0296053859" for a call intended to be established in standard quality or "Call 0296053859 at broadband quality" for a call intended to be established at broadband quality. It is understood that the level of quality of the communication which will be established by a given addressee terminal 21 to 24 is dependent on the capabilities of this terminal. Consequently, the message/icon displayed by a terminal indicates which level of communication quality will be obtained in the case of establishment of the communication by means of this terminal. The form of the message/icon is determined either by the gateway 10 as a function of the information about the capabilities of the calling and called terminals at its disposal, or by the terminal considered, as a function of the content of the notification received from the gateway in step 230. The user can therefore choose to establish the communication as a function of the information displayed, so as to benefit from the best possible communication quality.

According to a second alternative, this information is performed by display, by the gateway 10 and/or the terminal or terminals receiving the call notification, of an icon representative of the level of maximum quality of coding liable to be used by the calling terminal or of a message informing the user about this level of quality. Consequently, the message/icon displayed by a terminal is, in this second alternative, independent of this terminal's specific capabilities, since it depends solely on the capabilities declared by the calling terminal. In this alternative, the user can also choose to establish the communication as a function of the information displayed, so as to benefit from the best possible communication quality, but must furthermore ascertain the capabilities of the various terminals so as to make an optimum choice in respect of the quality of the communication established.

An embodiment of the invention generalizes to the processing of any request to instigate communication sent with a view to establishing a communication of any type (audio, video, data, etc.) and taking into account any communication capacity having an impact on the quality of the communication established, in particular the coding capabilities of the terminals (audio coding parameters, number of audio channels (e.g. mono/stereo), video, compression rate, bandwidth, etc.).

An embodiment of the invention is applicable to any type of call routing device, in particular to a call routing device forming part of the network core of a telephone network.

An embodiment of the invention is applicable to any type of terminal, including a mobile terminal, assuming that this terminal would receive its communications via a call routing device such as described.

An embodiment of the invention is also applicable to a so-called multimode terminal, that is to say combining several communication and coding modules endowed with different capabilities, for example a broadband codec and a codec for reception at standard quality. In this application, the call routing is performed in the terminal itself, this terminal fulfilling at one and the same time the functions of the routing device 10 and those of the terminals 21 to 24 and identifying a communication module to be activated so as to receive a call as a function of the capabilities declared by the calling terminal. In this case, the call presentation mode implemented by the terminal is that described in detail hereinabove for a broadband terminal when the activated communication module is a module fitted with a broadband codec making it possible to obtain a communication of maximum quality. Conversely, the call presentation mode implemented by the terminal is that described hereinabove for a standard terminal when the activated communication module is a module which does not make it possible to obtain a communication of maximum quality. The terminal will ring in particular in a different manner depending on the communication module used to actually establish the communication.

An embodiment of the invention is applicable to any known call presentation procedure: by triggering ring tones and/or vibrations (vibrator mode in the case of a mobile telephone), sending of audio signals and/or visual indicators of a call, display of textual information, etc. The alternatives and embodiments described hereinabove are thus transposable without difficulty when using a call presentation procedure other than a ring tone.

Although the present disclosure has been described with reference to one or more examples, workers skilled in the art will recognize that changes may be made in form and detail without departing from the scope of the disclosure and/or the appended claims.

The invention claimed is:

1. A method for processing a request to instigate communication, received by a routing device associated with a plurality of terminals, relating to a communication to be established between a sender device issuing said request and at least one of said terminals, the method comprising the following acts, preliminary to establishing said communication, comparing communication capabilities of said sender device with respective communication capabilities of said plurality of terminals, so as to identify among the plurality of terminals:

at least one terminal having capabilities making it possible to establish with the sender device a communication of maximum quality, and at least one terminal not having capabilities making it possible to establish with the sender device a communication of maximum quality, and transmitting to all said plurality of terminals, at least one call notification, said call notification being suitable for triggering, on the at least one terminal having capabilities making it possible to establish with the sender device a communication of maximum quality, a call presentation different from a call presentation triggered on the at least one terminal not having capabilities making it possible to establish with the sender device a communication of maximum quality, such different call presentation prompting a user to go off-hook by means of one of the at least one terminal having capabilities making it possible to establish with the sender device a communication of maximum quality, said at least one call notification being transmitted, in a first phase, to the at least one terminal having capabilities making it possible to establish with the sender device a communication of maximum quality, and, in a second phase, if the user did not go off hook during the first phase, to any other terminals that are able to establish said communication.

2. The method as claimed in claim 1, in which the at least one transmitted notification is suitable for triggering a call presentation allowing a user to distinguish the at least one terminal having capabilities making it possible to establish with the sender device a communication of maximum quality with respect to any other terminals that are able to establish said communication.

3. The method as claimed in claim 1, comprising informing said user about a level of communication quality liable to be obtained for said communication.

4. A non-transitory recording medium readable by a data processor on which is recorded a program comprising program code instructions for execution of a method for processing a request to instigate communication, received by a routing device associated with a plurality of terminals, relating to a communication to be established between a sender device issuing said request and at least one of said terminals, the method comprising the following acts, preliminary to establishing said communication,
comparing communication capabilities of said sender device with respective communication capabilities of said plurality of terminals, so as to identify among the plurality of terminal:
at least one terminal having capabilities making it possible to establish with the sender device a communication of maximum quality, and
at least one terminal not having capabilities making it possible to establish with the sender device a communication of maximum quality, and
transmitting to all said plurality of terminals, at least one call notification, said call notification being suitable for triggering, on the at least one terminal having capabilities making it possible to establish with the sender device a communication of maximum quality, a call presentation different from a call presentation triggered on the at least one terminal not having capabilities making it possible to establish with the sender device a communication of maximum quality, such different call presentation prompting a user to go off-hook by means one of the at least one terminal having capabilities making it possible to establish with the sender device a communication of maximum quality, said at least one call notification being transmitted, in a first phase, to the at least one terminal having capabilities making it possible to establish with the sender device a communication of maximum quality, and, in a second phase, if the user did not go off hook during the first phase, to any other terminals that are able to establish said communication.

5. A device for processing a request to instigate communication, received by a routing device associated with a plurality of terminals, relating to a communication to be established between a sender device issuing said request and at least one of said terminals, the processing device comprising,
means for comparing communication capabilities of said sender device with respective communication capabilities of said plurality of terminals, so as to identify among the plurality of terminals:
at least one terminal having capabilities making it possible to establish with the sender device a communication of maximum quality, and
at least one terminal having capabilities making it possible to establish with the sender device a communication of maximum quality, and
means for transmitting to all said plurality of terminals, said call notification being suitable for triggering, on the at least one terminal having capabilities making it possible to establish with the sender device a communication of maximum quality, a call presentation different from a call presentation triggered on the at least one terminal not having capabilities making it possible to establish with the sender device a communication of maximum quality, such different call presentation prompting a user to go off-hook by means of one of the at least one terminal having capabilities making it possible to establish with the sender device a communication of maximum quality, said at least one call notification being transmitted, in a first phase, to the at least one terminal having capabilities making it possible to establish with the sender device a communication of maximum quality, and, in a second phase, if the user did not go off hook during the first phase, to any other terminals that are able to establish said communication,
said means for comparing and said means for transmitting being activated preliminary to said communication establishment.

6. A method for processing a request to instigate communication, the method comprising the following acts:
receiving the request by a terminal comprising a plurality of communication modules, the request relating to a communication to be established with a sender device issuing said request by at least one of said modules, and, preliminary to establishing said communication,
comparing communication capabilities of said sender device with respective communication capabilities of the plurality of modules, so as to identify among the plurality of modules:
at least one module having capabilities making it possible to establish with the sender device a communication of maximum quality, and
at least one module not having capabilities making it possible to establish with the sender device a communication of maximum quality, and
presenting said request to a user, said request presentation being different for the at least one module having capabilities making it possible to establish with the sender device a communication of maximum quality than for the at least one module not having capabilities making it possible to establish with the sender device a communication of maximum quality, and being used to establish said communication, prompting the user to go off-hook so as to establish the communication using the at least one module having capabilities making it possible to establish with the sender device a communication of maximum quality, said at least one call notification being transmitted, in a first phase, to the at least one terminal having capabilities making it possible to establish with the sender device a communication of maximum quality, and, in a second phase, if the user did not go off hook during the first phase, to any other terminals that are able to establish said communication.

7. A terminal comprising:
a plurality of communication modules, which are adapted to receive a request to instigate communication relating to a communication to be established with a sender device issuing said request by at least one of said modules,
means for comparing communication capabilities of said sender device with respective communication capabilities of the plurality of modules, so as to identify among the plurality of modules:
  at least one module having capabilities making it possible to establish with the sender device a communication of maximum quality, and
  at least one module not having capabilities making it possible to establish with the sender device a communication of maximum quality, and
means for presenting said request to a user, said means for presenting being configured to present in a different manner said request for the at least one module having capabilities making it possible to establish with the sender device a communication of maximum quality than for the at least one module not having capabilities making it possible to establish with the sender device a communication of maximum quality, and being used to establish said communication, prompting the user to go off-hook so as to establish the communication using the at least one module having capabilities making it possible to establish with the sender device a communication of maximum quality, said at least one call notification being transmitted, in a first phase, to the at least one terminal having capabilities making it possible to establish with the sender device a communication of maximum quality, and, in a second phase, if the user did not go off hook during the first phase, to any other terminals that are able to establish said communication,
said means for comparing and said means for presenting being activated preliminary to said communication establishment.

8. The method as claimed in claim 1, in which:
said sender device has a broadband codec,
said comparing act is performed to identify at least one terminal having a broadband codec compatible with the broadband codec from the sender device.

9. The method as claimed in claim 6, in which:
said sender device has a broadband codec,
said comparing act is performed to identify at least one module having a broadband codec compatible with the broadband codec from the sender device.

* * * * *